United States Patent
Gillick et al.

[11] Patent Number: 5,530,455
[45] Date of Patent: Jun. 25, 1996

[54] ROLLER MOUSE FOR IMPLEMENTING SCROLLING IN WINDOWS APPLICATIONS

[75] Inventors: William G. Gillick; Clement C. Lam, both of San Jose, Calif.

[73] Assignee: Mouse Systems Corporation, Fremont, Calif.

[21] Appl. No.: 288,945

[22] Filed: Aug. 10, 1994

[51] Int. Cl.$^6$ .................................................. G09G 5/08
[52] U.S. Cl. ............................ 345/163; 345/156; 345/123
[58] Field of Search .................................. 345/156, 157, 345/162, 163, 167, 189, 192, 123

[56] References Cited

U.S. PATENT DOCUMENTS

| | | | |
|---|---|---|---|
| 4,101,879 | 7/1978 | Kawaji et al. | 345/162 |
| 4,954,817 | 9/1990 | Levine | 345/179 |
| 4,987,551 | 1/1991 | Garrett, Jr. | 345/162 |
| 5,053,761 | 10/1991 | Webster, III | 345/123 |
| 5,095,303 | 3/1992 | Clark et al. | 340/710 |
| 5,122,785 | 6/1992 | Cooper | 345/123 |
| 5,142,669 | 8/1992 | Inoue et al. | 395/157 |
| 5,196,838 | 3/1993 | Meier et al. | 345/123 |
| 5,313,229 | 5/1994 | Gilligan et al. | 345/123 |
| 5,345,552 | 9/1994 | Brown | 345/123 |

*Primary Examiner*—Ulysses Weldon
*Assistant Examiner*—Matthew Luu
*Attorney, Agent, or Firm*—Schneck & McHugh

[57] ABSTRACT

A computer mouse having a roller which implements a scrolling function for computer programs, particularly those running a windows format. In one embodiment, scrolling is implemented by sending messages to a queue associated with a windows kernel. The kernel interprets scrolling messages from the roller in the same manner as messages generated in the usual way from a graphical user interface. Rapid turning of the roller generates pulses which are stored in a buffer and interpreted as energy which is drawn from the buffer even after the roller stops turning so that scrolling continues until stopped or until the buffer is depleted.

19 Claims, 4 Drawing Sheets

ROLLER MOUSE FOR IMPLEMENTING SCROLLING IN WINDOWS APPLICATIONS

TECHNICAL FIELD

The invention relates to computer pointing devices, such as mice and trackballs, for scrolling applications in Windows, or the like.

BACKGROUND ART

A mouse is a control device, used with a computer and monitor, in which one or more transducers in a movable, hand-held device convert translational motion into a position signal, most frequently used for controlling a cursor. Other signals may be generated by finger actuated buttons on the device. Movement of the device is converted to movement of the cursor. Motion is sensed in x and y directions, and sometimes rotation in the x-y plane known as yaw motion is also sensed, as the housing moves over a surface known as a pad. Analogous motion of the cursor in x and y directions takes place as the mouse delivers its position signals to an associated computer. Rotational motion is useful in applications software, such as drawing or computer aided design (CAD) programs. An example of a mouse with optical sensors for detecting motion is U.S. Pat. No. 4,920,260, by K. Victor and C. Goy, assigned to the assignee of the present invention. In this patent the mouse moves over a pad having a repetitive pattern of optical markings which are illuminated by a beam of light. Line crossings are counted as a measure of motion of the device. U.S. Pat. No. 4,364,035 to S. Kirsch shows a similar device, with a different detection scheme. One of the features of the Kirsch mouse, described with reference to FIG. 6 of the '035 patent,, is that it can detect rotation, as well as translation,. See U.S. Pat. No. 4,797,544 to J. Montgomery which describes circuitry for tracking two optical detectors reporting two position locations X1, Y1 and X2, Y2 in order to compute rotation. See also U.S. Pat. No. 4,984,287 to Massoudi, assigned to the assignee of the present invention. Although the two detectors described in the latter two patents exist in a scanner, they could also exist in a mouse, as in the '035 Kirsch patent, hereafter collectively referred to as a "dual detector mouse".

A trackball is another cursor control device. A trackball converts rotational motion of a ball into x,y quadrature signals, compatible with the x,y signals produced by a mouse. The ball is suspended in a fixed position, as shown in U.S. Pat. No. 4,933,670. The latter patent recognizes that more than three degrees of freedom or dimensions may be desirable in a trackball and incorporates control buttons, annular rings about the ball, and a partial keyboard for additional commands.

The need for more than three degrees of freedom has been recognized for certain new software applications, particularly graphics. For example, besides the usual x and y translation of images, rotation of images with yaw, roll and pitch is useful for examining the shape of an object. Moreover, a z degree of freedom is useful for pointing out depth of an object or for moving in an orthogonal direction in a spreadsheet to access depthwise layers of a three dimensional data space. This leads to 6 dimensions or degrees of freedom, even though roll, pitch and yaw are not necessarily independent of x, y and z. Rather roll, pitch and yaw can be another way of expressing motion in the same space as x, y and z.

In U.S. Pat. No. 5,095,303 Clark et al. disclose a mouse having six degrees of freedom for controlling x, y and z motion, plus pitch, roll and yaw.

Over the years, computer programs have become more sophisticated, calling for users to control various tools which are needed to fully implement a computer program. For example, the popular Windows operating system of Microsoft Corporation, which virtually requires use of a mouse, also uses the mouse to perform subfunctions within the operating system, such as erasing, painting, drawing lines of various widths, scrolling, defining blocks, moving or deleting blocks, and the like. Each of these subfunctions is usually implemented through a pull-down menu and clicking upon the desired subfunction and then using the mouse to define the dimensions or parameters of the subfunction.

While the Windows operating system has greatly simplified operation of a computer, implementation of subfunctions within windows based operating systems can still be tedious.

An object of the invention is to improve performance of Windows and similar operating systems and programs by simplifying and accelerating subfunctions performed by mice, in particular the scrolling function.

SUMMARY OF THE INVENTION

The above object has been met by supplementing windows or Windows operating system software to operate under the control of a mouse with a roller which implements scrolling. The turning of the roller, in conjunction with driver software, generates scroll signals to Windows which mimics the action of the user clicking in the scroll controls, but without requiring the cursor to be moved to the scroll controls. A particular novel aspect of the invention is conversion of the turning motion of the roller into signals which represent scrolling momentum so that scrolling may continue even after the roller stops turning.

The roller is mounted on a mouse housing so that a user can manipulate the roller while also able to actuate buttons on the mouse and control mouse movement. The roller is supported within a mouse housing with the roller projecting through the housing. Turning of the roller by a human finger indicates the extent of scrolling. Rotation of the roller is read by a shaft angle encoder which converts rotational motion of the roller into a number of pulse counts, indicating motion along the z-axis. A trackball has two degrees of freedom in addition to those provided by the mouse.

A windows program is augmented with a driver for scrolling each time the roller is moved. This driver is placed in parallel with the mouse controlled subfunctions, which are not modified. The driver generates messages to implement the same subfunctions normally called in other ways, such as pointing to a scroll bar with a mouse. The driver provides for conventional up and down scrolling and can also provide for left and right scrolling with an additional signal, such as depression of a shift key. Other keys may be used in combination with the roller for high speed scrolling or for stopping of scrolling, or for scrolling in an automatic mode.

BEST MODE FOR CARRYING OUT THE INVENTION

Figure 1:
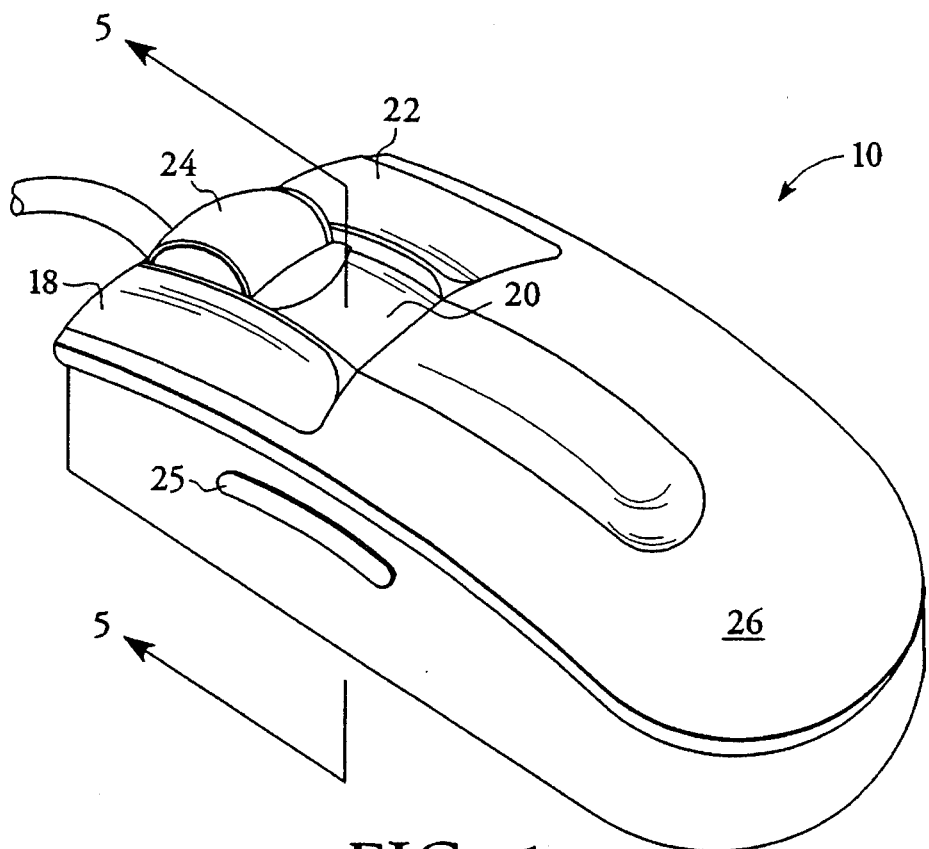
FIG. 1 is a perspective view of the mouse for implementing a scrolling function in accord with the present invention.

With reference to FIG. 1, a computer mouse 10 is shown having three buttons 18, 20 and 22 and a roller 24. Although this type of mouse is a mechanical mouse with respect to position sensing, an optical mouse which employs a pad surface with a pattern of grid lines could also be used.

The size of the mouse device is comparable to a cigarette pack and so the control buttons 18, 20 and 22 would be within finger reach of the roller 24 without much movement of the position of the palm of the hand on the rear portion 26 of the mouse housing. The roller generates a motion signal which activates scrolling in Windows or windows applications. "Windows" is a non-registered trademark of Microsoft Corporation for an operating system which implements certain functions with a mouse. As used herein, Microsoft's Windows refers to version 3.1 and newer versions, including the recently announced Chicago version. Applications running under Windows employ mouse implemented subfunctions, such as scrolling, using a mouse to point to scroll bars or buttons. This is part of the current standard Microsoft protocol for Windows applications.

Figure 2:
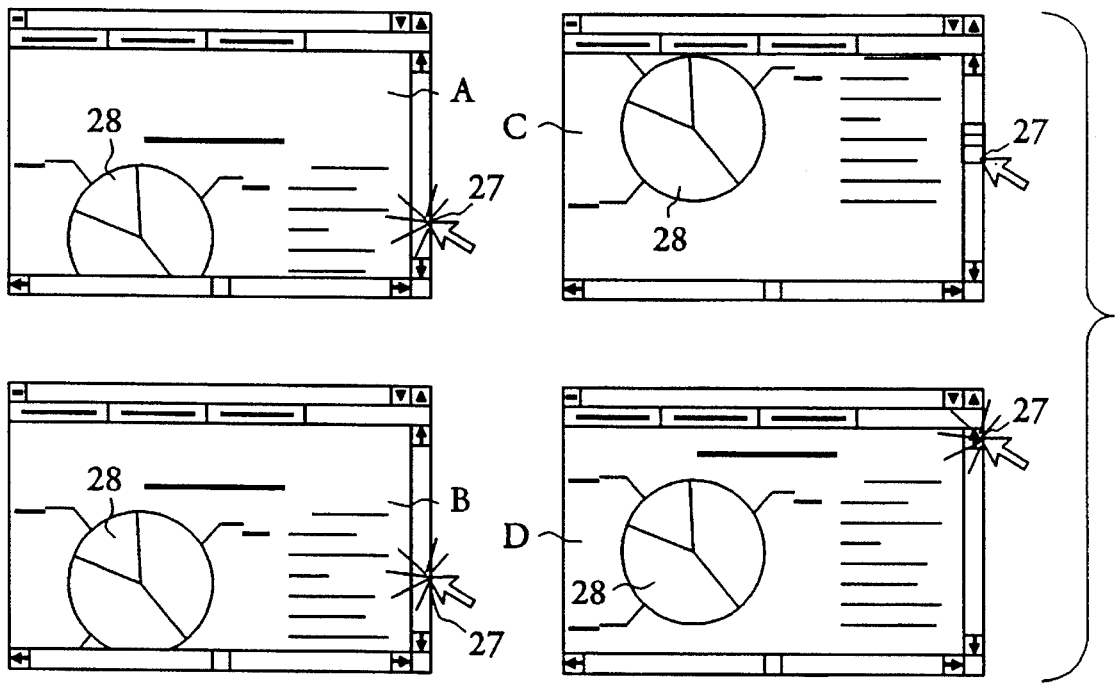
FIG. 2 is a view of screens where scrolling is implemented in Windows in accord with the prior art.

With reference to FIG. 2, scrolling is shown to be implemented in the prior art. In screen A, a user is attempting to center the pie chart 28 in the window by pointing and clicking on the scroll bar at position 27 with a mouse.

In screen B, the user realizes that the pie chart is still too low and attempts to raise the pie chart by pointing and clicking at position 27 on the scroll bar. The pie chart rises and is heading for an overshoot, seen in screen C. The user drags the movable scroll control upward at point 27 on the scroll bar to pull pie chart 28 down slightly and then makes a slight downward adjustment as seen in screen D where the pie chart is finally centered in the screen.

Figure 3:
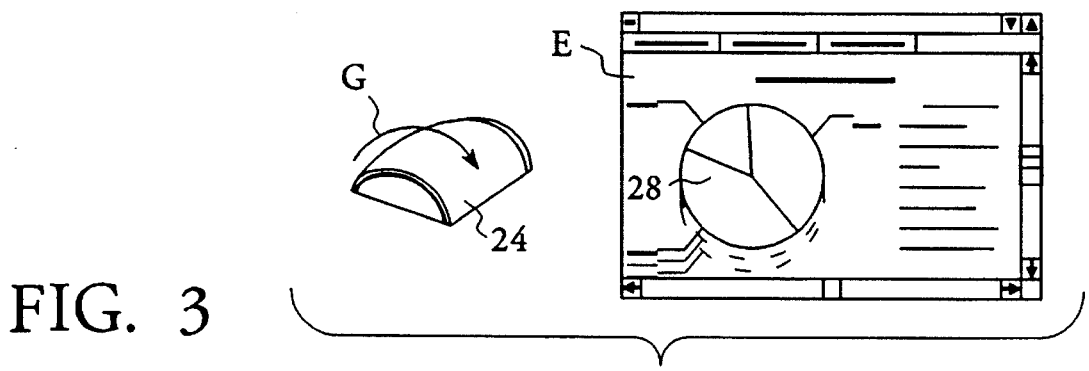
FIGS. 3 and 4 show screens where scrolling is implemented in Windows using a roller mouse in accord with the present invention.
Figure 4:
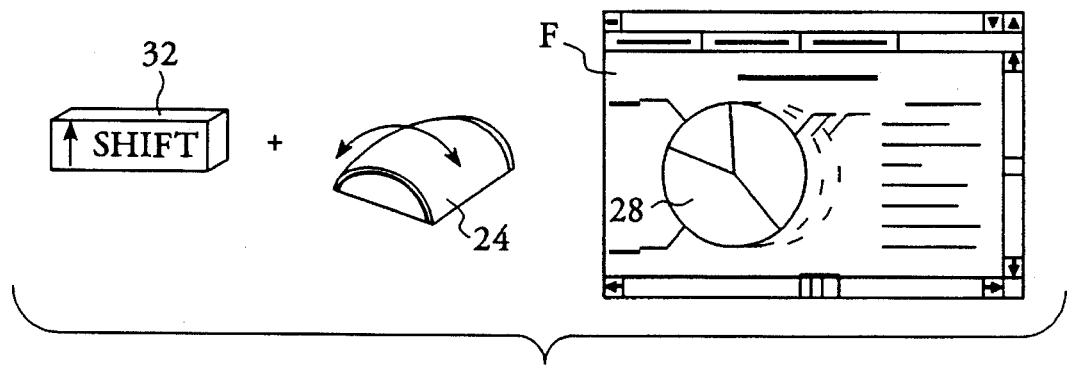

In contrast, FIG. 3 shows roller 24 which is turned in the direction of arrow G to make downward adjustments of the pie chart 28 in screen E. The vertical position of the pie chart may be precisely adjusted using a single motion of the roller in either direction. FIG. 4 shows lateral adjustment of pie chart 28 in screen F, implemented by roller 24 plus shift key 32. In other words, shift key 26 is depressed at the time roller 24 is moved to implement lateral scrolling. Motion of the roller 24 by itself implements vertical scrolling.

Figure 5:
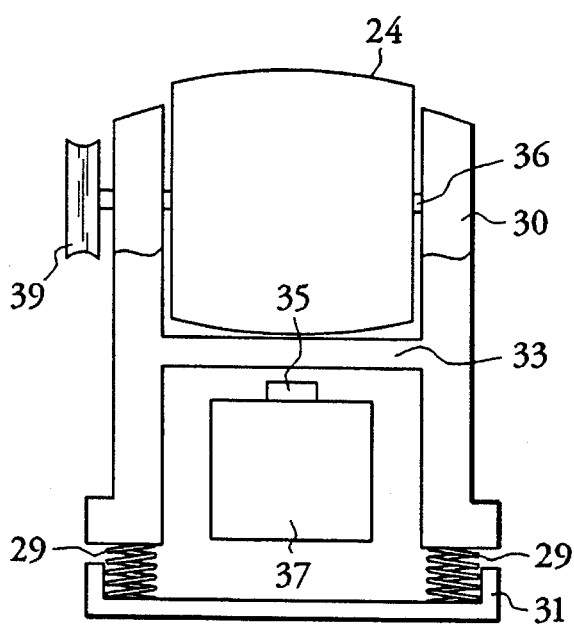
FIG. 5 is a detail showing construction of a roller in the mouse illustrated in FIG. 1.
Figure 6:
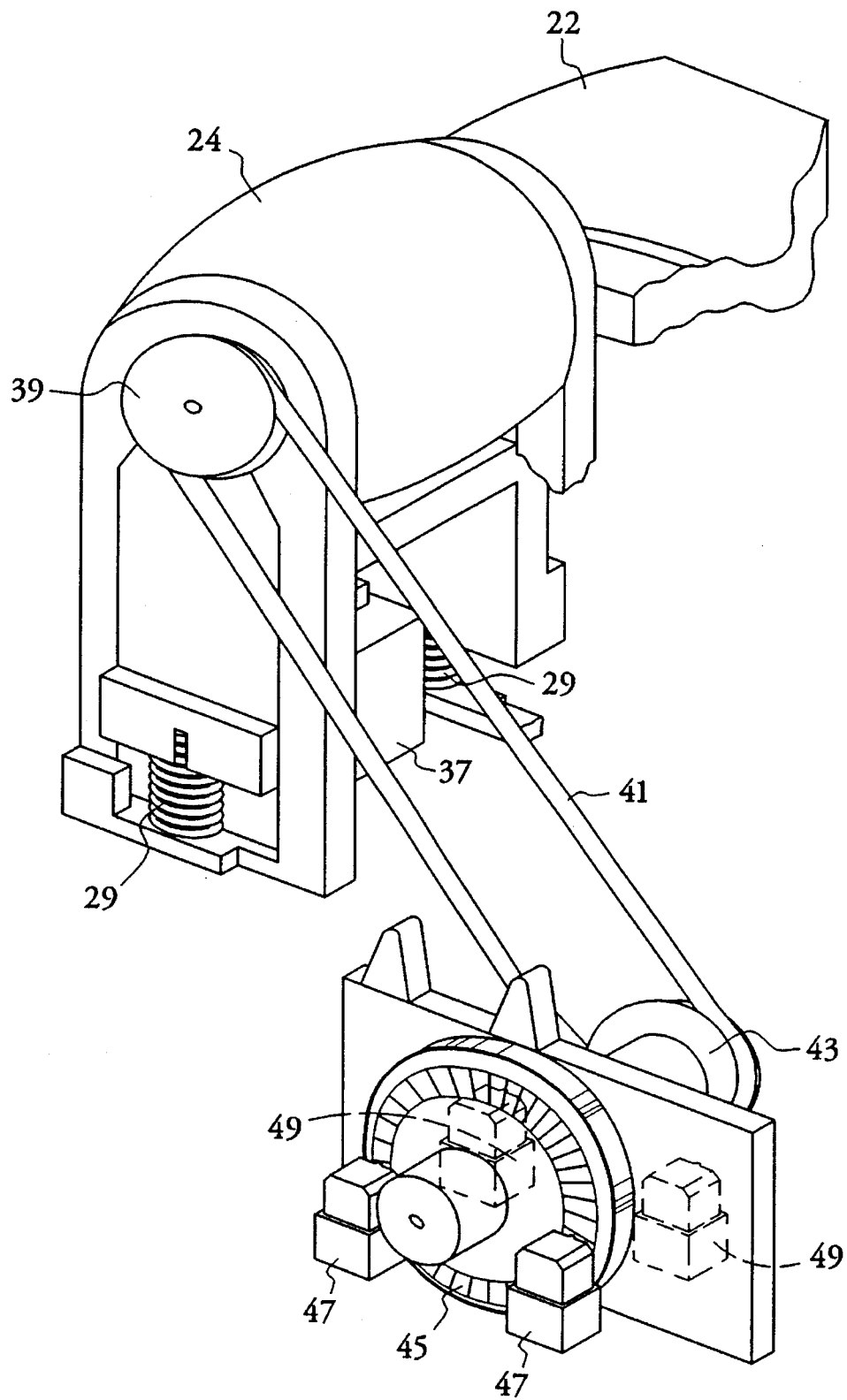
FIG. 6 is a detail showing a roller motion detector and suspension in the mouse of FIG. 1.

With reference to FIG. 5, the roller 24 is supported by an axial shaft 36 to a frame 30. The frame rests on small helical springs 29 which are held in place by a pedestal 31 which may be a part of the bottom surface of the mouse housing. Springs 29 allow the roller 24 to be depressed together with the support frame 30. A crossbar 33 which is permanently fixed in position on the frame contacts the actuator button 35 of a microswitch 37 which produces an electrical signal when the roller and its frame are depressed. A pulley 39 rotates with the shaft 36 for supplying rotational information to a belt which is attached to pulley 39. This can be seen in FIG. 6.

Rotation of pulley 39 turns belt 41 which in turn rotates the optical encoder disk 45 which is read by the optical detectors 47 which, in turn, read a light beam transmitted by the transmitters 49. Shaft angle encoders for reading rotation of a wheel, such as roller 24, are well known.

Figure 7:
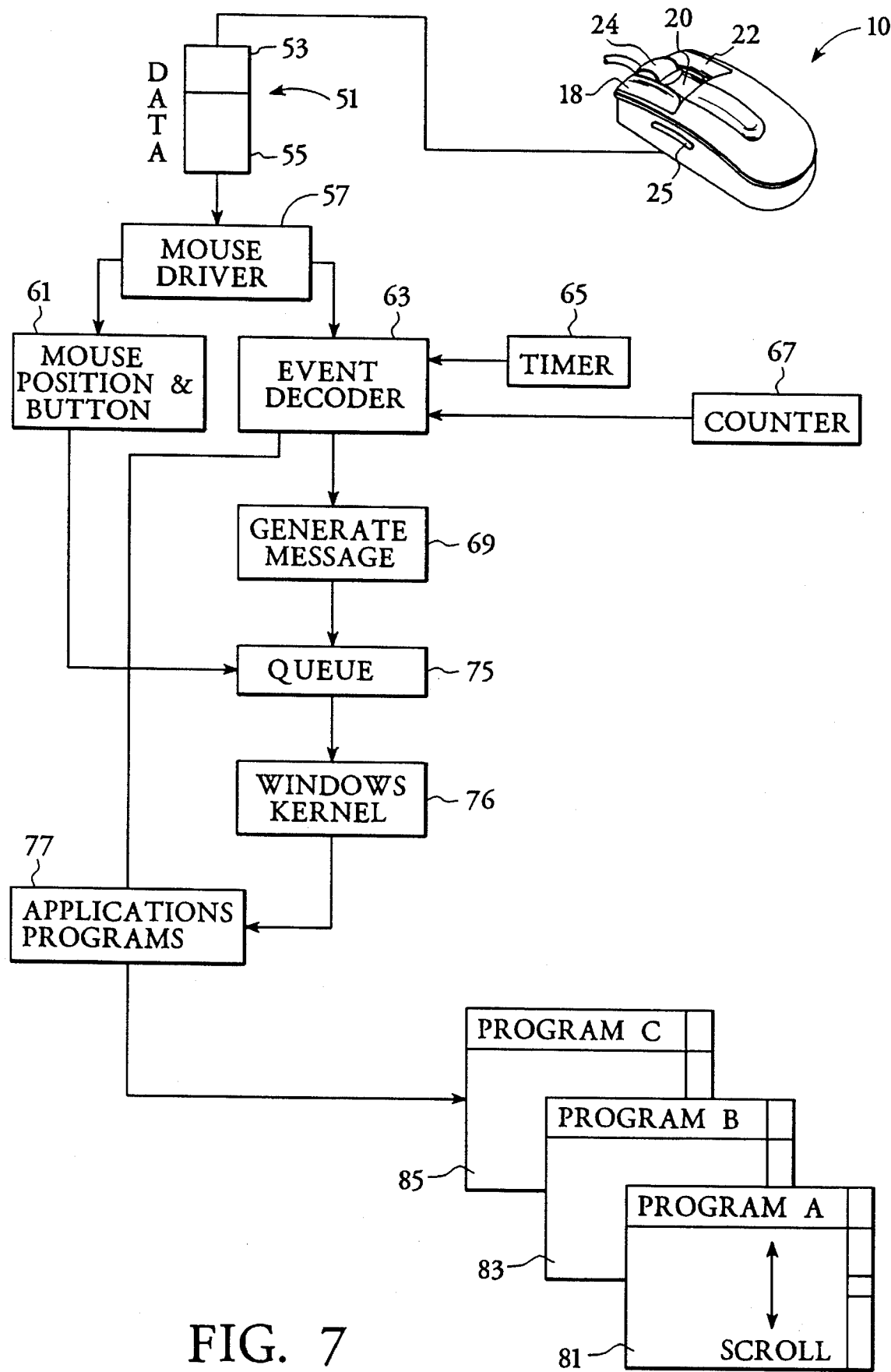
FIG. 7 is a flow diagram for implementing Windows subfunctions in accord with the present invention.

With reference to FIG. 7, a mouse 10 is seen to generate data packets 51 which are typically eight bytes. The packet 51 is divided into two subpackets 53 and 55. A three-byte portion 53 consists of information relating to x movement, y movement and button status of three mouse buttons 18, 20 and 22 in FIG. 1. The second data portion 55 consists of five bytes representing pure motion of the roller 24 as Z movement, pitch movement indicated by roller motion while the side button 25 is pressed, roll movement indicated by roller motion while another button is pressed, plus yaw movement which may be generated by rotating the mouse housing in the x-y plane. Lastly, one byte contains the state of the side button 25, and the roller switch 37, seen in FIG. 6. Returning to FIG. 7, the eight-byte data packet enters the mouse driver software 57 which interprets the data and splits the two portions. The portion 53 is interpreted in the usual way as x-y mouse position and button information, represented by block 61. This information is sent to the queue 75 which is processed by the main Windows kernel 76 in the usual way. Mouse messages are processed by the kernel to establish the current position of the cursor. The location of the cursor determines a specific action Windows will take with reference to applications programs 77, running under Windows. These programs are indicated as program A 81, program B 83 and program C 85.

Returning to the mouse driver 57, the data portion 55 containing roller and side button information is sent to an event decoder 63 which is in the nature of a software control panel. The event decoder interprets roller and button motion and is linked to a timer 65 which receives timing signals from a crystal oscillator associated with the computer system to which the mouse is connected. Also connected to the event decoder is a counter 67 which functions as an energy storage tank in combination with the timer 65. If counter 67 counts a large number of pulses from the roller's shaft angle encoder over a short period of time, the count is stored in a buffer within the decoder. The buffer is analogous to an energy storage tank where the supply of pulses stored is analogous to the fill level of the tank and the level is potential energy. When the "energy level" of the tank is above a minimum threshold, energy is released at a certain rate. This allows scrolling to take place, even after a roller has been turned, if it is turned fast for a short period of time. Decoder 63 is connected to a message generator 69 which is a memory device producing messages recognized by Windows in response to decoded events. The rate at which messages are generated depends upon counts received from the event decoder 63. A rapid count rate translates proportionately to a rapid message generation or rate. However, counts can be accumulated faster than messages can be generated, so that there is an excess amount of counts which become messages after quick, extensive roller motion ceases.

A certain number of roller counts may be interpreted as Windows LINESCROLL messages. If a large number of counts accumulate, above a certain threshold, PAGESCROLL messages may be sent because Windows cannot scroll sufficiently fast above a certain rate of linescrolls. The energy level previously mentioned determines which type of message is generated and the control panel software is configured with this information, for example in a configuration file.

A "power" scrolling function is implemented using the roller 24 in combination with roller button 25. Power scrolling occurs with ordinary counts from the shaft angle encoder, without the necessity of accumulating counts in the manner described previously. Even after the roller stops rolling, scrolling continues at a constant rate until a terminating event occurs. However, if the roller is reversed from its original direction, counts are removed from the buffer proportionally to the degree of roller rotation. This causes the scrolling to slow down because counts are being removed from the buffer. If the user terminates the power scroll mode by clicking a button or by any designated means, then the stored count is zeroed. This halts all SCROLL messages immediately. Scrolling is halted at any time by reversing the roller back to its starting position or by clicking a button or any designated means. Just as in the previously described power scroll mode, the counts in the buffer are zeroed and SCROLL messages are halted.

Other keyboard functions such as Up Arrow, Down Arrow, Page Up, Page Down, Menu scrolling, List Box scrolling, and so on may be implemented by the roller mouse of the present invention in a manner analogous to that described previously, except with a different configuration of the roller. Counts from the roller are interpreted in a suitable manner and adjusted by roller speed setting in a configuration file.

In operation, normal turning of the roller causes documents to scroll vertically. The instantaneous value of roller motion is compared with a threshold level to determine if SCROLL messages are to be generated. If the threshold is exceeded, then the scroll timer 65 in FIG. 7 will begin converting the value of the roller output, into one or more WM_VSCROLL (vertical scroll) or equivalent messages, recognized by the Windows kernel. These messages are sent to queue 75 which communicates with Windows kernel 76 affecting the topmost or active window on the screen and the document will scroll one line for each WM_VSCROLL message.

The speed of scrolling and the amount of scrolling are determined by two factors. One factor is the velocity of turning of the roller on the mouse and the second is a setting which may be employed in the event decoder 63. This causes the timer 65 to generate WM_VSCROLL messages at a set rate. Horizontal messages for scrolling WM_HSCROLL, as well as other scroll messages are generated in the same way.

The roller is used for another feature related to program switching. The roller is depicted on the screen and appears to rotate from one open application to another. The control panel software causes appropriate windows programs to be shown on an image of a roller, supplied as an icon. For example, the sequence Show Window (B), Show Window (C) will first cause program B to appear on the roller, then program C. Switching of the programs or program rotation is enabled when the roller is rotated while the ALT key is held down or while the side button is held down.

The present invention allows other events to be controllable in an analogous manner. Standard Windows functions may be controlled which are assignable to individual keys or buttons, such as Minimize Window and Next Window which are normally invoked by a menu command or keyboard command. In the present invention, a dedicated mouse function may generate a message which is posted to the queue in the manner described previously. Functions such as Page Scroll Up and Page Scroll Down may use the middle and right mouse buttons. WM_VSCROLL messages are respectively placed directly into the queue 75 without requiring any input from the timer 65 for this function.

Sample messages are shown in the following table. Each sub-section shows the type of Windows functions and messages used to generate the expected action. Please note that "hWnd" and "hWindow" refer to the "window handle" or window identifier which is the recipient of the message.

```
1. Vertical Scrolling Down:
   HWND     hWnd = ::GetFocus ( );
   ::PostMessage (hWnd , WM_VSCROLL, SB_LINEDOWN, lParam);
   ::PostMessage (hWnd , WM_VSCROLL, SB_ENDSCROLL, lParam);
2. Horizontal Scrolling Right:
   HWND     hWnd = ::GetFocus ( );
   ::PostMessage (hWnd , WM_HSCROLL, SB_LINEDOWN, lParam);
   ::PostMessage (hWnd , WM_HSCROLL, SB_ENDSCROLL, lParam);
3. Vertical Page Scrolling Down:
   HWND     hWnd = ::GetFocus ( );
   ::PostMessage (hWnd , WM_VSCROLL, SB_PAGEDOWN, lParam);
   ::PostMessage (hWnd , WM_VSCROLL, SB_ENDSCROLL, lParam);
4. Rotate Programs Forward:
   char      cTmpBuf [IC_STRINGLENGTH];
   HWND     hCurrentWnd = ::GetFocus ( );
   HWND     hParentWnd = getWindowName (hCurrentWnd, cTmpBuf);
   ::PostMessage (hParentWnd, WM_SYSCOMMAND, SC_NEXTWINDOW, 0L);
   ::ShowWindow (::GetFocus ( ), SW_RESTORE);
5. Rotate Programs Backward:
   char      cTmpBuf [IC_STRINGLENGTH];
   HWND     hCurrentWnd = ::GetFocus ( );
   HWND     hParentWnd = getWindowName (hCurrentWnd, cTmpBuf);
   ::PostMessage (hParentWnd, WM_SYSCOMMAND, SC_PREVWINDOW, 0L);
   ::ShowWindow (::GetFocus ( ) , SW_RESTORE);
6. Next Window:
   HWND     hWindow = ::GetFocus ( );
   HWND     hParent = ::GetParent (hWindow);
   ::PostMessage (hParent, WM_MDINEXT, (unsigned) hWindow, 1);
7. Double-Click:
   LPARAM lParam = (LPARAM)mousePosition (hWnd);
   WPARAM wParam = (WPARAM)keyState ( );
   ::PostMessage (hWnd, WM_LBUTTONDBLCLK, wParam, lParam);
```

In the above table, the functions and parameters are described in detail in the Microsoft Windows Software Development Kit for Windows version 3.1.

The present invention implements automatic or momentum scrolling so that continuous stroking of the roller to create continuous motion is not needed. A short stroke of the roller will generate a short, quick Windows scroll, as previously described. A description of the algorithm follows.

One discrete stroke of the roller will generate a consecutive stream of driver packets that contain roller counts in accord with the following algorithm. If (time_since_lastScrollEvent>endScroll_timeout) AND (TotalOf(consecutive new_rollerCount packets)>scroll Start_threshold), then the TotalOf value causes an immediate scroll event, the amount of which is adjusted by the Roller Speed setting; there is no momentum scrolling at this point. The (time_since_lastScrollEvent>endScroll_timeout) test ensures that roller Scrolling is not currently in progress.

Multiple roller strokes in quick succession, however, cause momentum scrolling to occur. The first stroke values begin taking effect immediately as above, but the second and later strokes cause roller counts to be directed to the "energy storage tank" store. Now, decay time and new roller strokes become the determining factor affecting duration and speed of scrolling as described below. If (time_since_lastRollerPacket<firstStroke_timeout) AND (roller_velocity>minimumRollerSpeed_threshold), then TotalOf(consecutive new_rollerCount packets) are added to the energy storage buffer. Roller velocity is determined by the number of counts accumulated per unit time. A minimum input threshold is set in order to filter out effects of the user resting his finger on the roller and occasionally generating counts.

When roller counts in the "energy store" exceed a certain threshold, it is assumed that the user wishes to scroll faster than line-by-line. In this case, the scroll messages are output as PageScroll events, rather than LineScroll events. This is transparent to the user. Likewise when the user stops rolling and the store is depleted below a certain threshold, PageScroll events cease and LineScroll events are substituted at a rate determined by the level in the store until all scrolling ceases when the store equals zero. The algorithm is as follows: If (energy_store>pageBoost_threshold) AND (currentScrollType=byLine), then set currentScrollType=byPage. Also, if (energy_store<lineReduce_threshold) AND (currentScrollType=byPage), then set currentScrollType=byLine.

A summary of cumulative roller events is as follows: One roller stroke initiates one burst of scroll events, no momentum. Two or more strokes in quick succession initiate momentum scrolling, termed SmartScrolling. LineScrolling accelerates into PageScrolling and PageScrolling decelerates into LineScrolling, automatically. Short roller reversal halts all momentum.

Momentum scrolling is very easily invoked and it is even more easily halted. This prevents the scrolling events from getting out of control. Of course, even without direct action, momentum scrolling will decelerate and halt by itself. Listed below are the specific events or event categories that stop momentum scrolling action and return control to the user.

The recommended method to stop momentum scrolling action is to slightly reverse the direction of the roller. Scrolling will stop on the first stroke. If the user continues to stroke the roller in this reverse direction, then momentum scrolling begins in this reverse direction. The user may also halt momentum scrolling with a reverse stroke, then begin stroking in the original direction. The algorithm is as follows: If (TotalOf(new_rollerCount packets)>reversed Roller_threshold) AND (SmartScroll is in progress), then delete new_rollerCounts, zero the energy store, and delete any pending scroll events. Also, reset all dynamic parameters to a clean stop.

Clicking any button on the mouse in most cases stops momentum scrolling instantly. The left, middle and right buttons 18, 20, 22, respectively, stop momentum scrolling on the press of the button. On the release, nothing happens. The Roller Button 37 and Side Button 25 stop momentum scrolling on the Press, but implement its specifically-programmed function on the Release. For example, the Side Button 25 when clicked will stop momentum scrolling and switch to Previous Program in one step. Likewise, if the Roller Button 37 is programmed for Powerscroll toggle, pressing it will stop momentum scrolling, and releasing it will enable PowerScroll.

Typing any non-modifier key on the keyboard (or a modifier plus key combination) will halt momentum scrolling. Pressing a modifier key alone does not halt momentum scrolling, but modifies its function as described above. Pressing the Alt key, then rolling the roller, halts momentum scrolling and immediately performs the expected Program Rotate.

If the user deliberately closes the current application, or the application itself terminates, momentum scrolling will cease.

Clicking the roller button engages the automatic, roller-controlled, speed-scrolling of documents, known as PowerScroll. It is similar to momentum scrolling but its scrolling is deliberately enabled. Also, momentum scrolling eventually comes to a stop and needs occasional roller strokes to keep going because of built-in "deceleration" whereas PowerScroll can scroll through an entire document without touching the roller again. PowerScroll overrides the current Roller Setting. While PowerScroll "mode" is active, the cursor shape changes to a PowerScroller cursor. This has the shape of a roller with two opposite pointing arrows. This cursor may be slightly different from the Smart Scrollbars cursor. PowerScroll is implemented as follows.

If (Button Settings [button X]=PowerScroll toggle) AND (button X clicked), then PowerScroll mode is now invoked. The program attempts to put up a vertical Scroller cursor to indicate the modal nature of PowerScroll. At this point the roller may be rotated in either direction to start the document scrolling at a variable speed in the chosen direction. Currently, the PowerScroll toggle is assigned by default to the Roller Button.

There is another, optional way to initiate PowerScroll, but in a temporary, easily-terminated mode. This is a variation of the normal PowerScroll trigger, except that the trigger button (usually the roller button) is only pressed but not released for the duration of the PowerScroll action. This allows the roller button to be pressed down, the roller rolled, then released when the user has scrolled the desired amount. The algorithm is as follows: If (button X=Down) AND (TotalOf(new_rollerCount packets)>scrollStart_threshold), then while (button X=Down) engage PowerScroll.

If (Shiftkey=Down), then the axis of scrolling is switched between Vertical and Horizontal. Pressing Shift down while currently PowerScrolling or momentum scrolling, vertically continues the scrolling action in the horizontal direction with the same scrolling parameters (or possibly using scaled horizontal parameters). If (PowerScrolling is in progress), then while (Control key=Down), PowerScroll acts like momentum scrolling—scrolling is allowed to decelerate and new roller strokes add momentum. The user may reverse direction of the roller as is usual with momentum scrolling. Releasing the Control key returns to PowerScrolling and halts the deceleration process in the current direction of scrolling, regardless of the original direction of PowerScrolling. Additionally pressing the Shift key down causes the scrolling action to transfer to the opposite axis as is normal. The Shift key may be released independently of the Control key.

PowerScroll treats rotation of the roller differently from momentum scrolling. The roller acts as a variable speed scroll control that determines scroll speed by the amount of roller counts accumulated since the PowerScroll trigger was given. PowerScroll adds new roller counts algebraically. To slow down the scrolling, one begins reversing the roller until the scroll speed is satisfactory. The algorithm is as follows: While (PowerScroll=On), set (scrollSpeed=scrollSpeed +new_rollerCounts).

PowerScroll is similar to momentum scrolling in the methods to halt its scrolling action. The major difference is that PowerScroll does not decelerate to a halt itself—only the user can halt it. Listed below are the specific events or event categories that stop PowerScrolling action and return control to the user.

The recommended method to stop PowerScroll is to click again on the PowerScroll trigger button. PowerScroll will halt on the release of the button.

Another method is to reverse the roller back to approximately its original rotation point since clicking the trigger button. The scrolling should have halted—the minimum scrolling speed is approximately 1 line per second. As long as PowerScroll has not generated a single line scroll events in over 1 second, it is no longer in PowerScroll mode. The algorithm is as follows: If (TotalOf(new_rollerCount packets)<scrollStart_threshold) AND (PowerScroll is in progress) AND (thisState_durationTime>autoPower_off_timeOut), then set (PowerScroll=Off) and delete any pending scroll events and then reset all dynamic parameters to a clean stop.

Another form of scrolling control is termed Smart Scrollbars. This is a context-sensitive method, i.e. dependent on need determined or specified by an applications program, to invoke momentum scrolling when the cursor enters any part of the scroll bar regions. This allows a different scroll signal such as PageScroll to be assigned to the roller as the default roller function then be able to override this default by moving the cursor to a scroll bar.

When the cursor enters an application's scroll bar regions, it automatically enables momentum scrolling mode. The cursor changes to the Scroller cursor and all the momentum scrolling behavior described above is in effect as long as the cursor remains in the scroll region. When the cursor moves outside the scroll region, it reverts to its current application cursor and the document stops scrolling. If the application is already set for momentum scrolling, then scrolling is not affected and just the cursor reverts to the application cursor.

If (Roller Settings=momentum scrolling) AND (Smart Scrollbars=On), then moving the cursor in and out of the default scrollbar (that matches the current direction of scrolling) does not cause momentum scrolling to stop or change speed; only the Scroller cursor appears to indicate the scroll bar detection. If the cursor is moved into the opposite axis scrollbar (horizontal) for a certain minimum time constant: Scrollbar Entry_timeDelay, then the current SmartScroll parameters—speed, direction, and momentum—are transferred to that scrollbar without change, other than the normal HorizontalScaling; the current vertical direction is translated into its horizontal equivalent: Down43 Right, Up→Left. Likewise, when exiting any scrollbar region, there is a minimum time constant: ScrollbarExit_timeDelay after which the cursor and scroll axis revert to its defaults. This gives the user some temporal tolerance to remain inside the scrollbars. Note: if the Shift key is down, it still modifies SmartScroll's default axis of operation; and any Horizontal Scaling effect is active as is normal for SmartScroll.

If (Roller Settings!=SmartScroll) AND (Smart Scrollbars=ON) AND (the cursor is over a window scroll bar), then rotating the roller at least ±10 counts relative to (scrollStart_threshold) since the last roller-activated event initiates SmartScrolling. The Smart Scrollbars (SSB) cursor will appear after the Entry delay even if the roller has not been rolled. This lets the user know that SSB mode is active and ready to use.

If (Roller Settings=PowerScroll) AND (Smart Scrollbars=On) AND (the cursor is over a window scroll bar), then there is no change because the PowerScroll mode overrides any SSB mode.

As described above, when the cursor enters the scroll bar region, it enables momentum scrolling. This works for most window scroll bars—horizontal, vertical, and multiple-pane windows like split screens. In addition,, the Smart ScrollBar (SSB) detection logic works on most standard scroll bar control—volume controls, speed settings, contrast/brightness, etc.

If (Smart Scrollbars=On) AND (SmartScrolling is in progress), then while (Control key=Down), SmartScroll acts like PowerScroll just like pressing Control during Normal SmartScroll. However, pressing the Shift key down shall have no effect on the scroll axis since the cursor in the scroll bar determines axis. Releasing the Control key returns to the decelerating, momentum scrolling algorithm. In addition, moving the cursor out of the scroll bar region for longer than Scrollbar_Exit_timeDelay, causes the roller to return to its previous function such as Up/Down keys without transferring any momentum. This prevents any part of the document from changing if the user accidentally exits the scroll region.

We claim:

1. A computer input system for windows based application programs of the type using a bitmapped memory with a shiftable video capability for viewing a portion of the bitmapped memory at one time comprising, a multidimensional mouse controlling x,y cursor positioning on a video monitor associated with a computer of the type having a memory means for storing a bitmap of information to be displayed, the mouse having a body with a finger operated turnable member mounted for unbounded rotation thereon, generating electrical output signals having an extent proportional to the angular velocity of the turnable member, means for scrolling a portion of the bitmapped memory on the video monitor about a predetermined first axis, the bitmapped memory being associated with an application program running on the computer having the video monitor with any portion of the bitmapped memory not appearing on the video monitor being in the memory of the computer, said means for scrolling controllable via conventional input devices and the finger operated turnable member wherein the speed, amount, and direction of scrolling is proportional to the speed, amount, and direction of rotation of the turnable member as determined by said electrical output signals, whereby non-displayed portions of the bitmapped memory may be displayed, program means responsive to the electrical output signals from said turnable member for generating messages through the computer to the application program for scrolling the bitmapped memory on the video monitor.

2. The system of claim 1 wherein said program means comprises a decoder having a buffer storing said electrical output signals representing rotation of the turnable member.

3. The computer input system of claim 1 further comprising a control key selected from the group comprising a keyboard key and a mouse key on said multidimensional mouse, generating a signal to be logically combined with said electrical output signal to form a first composite signal indicative of scrolling motion of the bitmapped memory about a second axis other than said first axis.

4. A computer input device for windows based application programs of the type using a memory with a shiftable video capability for viewing a portion of the memory at one time and other portions by scrolling comprising, a multidimensional mouse controlling x,y cursor positioning on a video monitor associated with a computer of the type having a memory means for storing information to be displayed, the mouse having a body with a finger operated turnable member mounted for unbounded rotation thereon and for generating rotational output signals having an extent proportional to an angular velocity of the turnable member, an event decoder connected to receive said rotational output signals of the mouse and producing corresponding scroll signals and a timer means connected to the event decoder for timing the arrival of the rotational output signals, the event decoder having a buffer for indicating rotational momentum of the turnable member when the rotational output signals indicate a rotation rate above a threshold higher than zero, the presence of rotational momentum generating continuous scroll signals in the absence of continued generation of rotational signals by the turnable member, and means responsive to the scroll signals for viewing selected portions of the memory.

5. The device of claim 4 further comprising a message generator connected to the event decoder for receiving said scroll signals and generating scroll messages in response thereto, the message generator connected to a message queue.

6. The device of claim 5 wherein said message queue is associated with a windows-based kernel.

7. The device of claim 4 wherein said event decoder generates scroll right and scroll left signals in response to turning of the roller and depression of one of a mouse and keyboard key.

8. The device of claim 4 wherein said turnable member is a roller and said event decoder generates continuous and uniform scroll signals in response to turning of the roller and depression of one of a mouse and keyboard key.

9. A computer input device for windows based application programs running in a windows environment, a multidimensional mouse controlling x,y cursor positioning on a video monitor associated with a computer of the type having a memory means for storing information to be displayed, the mouse having a body with a finger operated turnable member mounted for unbounded rotation thereon and for generating electrical output signals having an extent proportional to the angular velocity of the turnable member, an event decoder connected to receive said electrical output signals of the mouse and producing corresponding rotation signals, means for serially selecting opened application programs, one after another in a cyclic manner, in response to said rotation signals, means for serially displaying separate images of icons in response to said rotation signals, and means for serially selecting opened application programs, each of said separate images corresponding to an opened application program wherein a displayed image is indicative of a currently selected opened application program.

10. The device of claim 9 wherein said image of an icon is displayed on an image of a roller.

11. A computer input system for windows based application programs using a bitmapped memory with a shiftable video capability for viewing a portion of the bitmapped memory at one time comprising, a multidimensional mouse controlling by electrical translational signals x,y cursor positioning on a video monitor associated with a computer of the type having a memory means for storing a bitmap of information to be displayed on a video display with at least one window having a scroll bar, the mouse having a body with a finger turnable member mounted for unbounded rotation thereon, generating electrical rotational signals having an extent proportional to the angular velocity of the turnable member, means for scrolling an application program having a portion of the bitmapped memory displayed, said means for scrolling being controlled via positioning the cursor in the scroll bar and turning the turnable member whereby non-displayed portions of the bitmapped memory may be displayed at a scrolling rate proportional to the angular velocity of the turnable member, program means responsive to the electrical rotational signals for generating messages through the computer to the applications program for scrolling the bitmapped memory on the video display.

12. The device of claim 11, wherein said scrolling is dependent on specification by the applications program.

13. The device of claim 11 wherein said cursor changes shape in said scroll bar region.

14. The device of claim 4 wherein the continuous scroll signals generated by the rotational momentum will be generated at a variable rate which slows down to zero in a time proportional to an amount of rotations stored in said buffer.

15. The system of claim 1 wherein the messages generated by the program means are bundled into packets of eight bytes each with three bytes used to convey x,y cursor positioning information and five bytes used to convey rotational information of the turnable member.

16. An input control system for use in windows based applications supporting scrolling of an image within a window comprising, a multidimensional mouse controlling x,y cursor positioning on a video display by means of electrical translational signals generated by translational movement of the mouse, said mouse further comprising an unbounded rotatable roller for use in controlling window scrolling by means of electrical rotational signals, the amount and speed of window scrolling being proportional to the amount and speed of rotation of the roller, wherein the roller is also a hidden mouse control button, means for determining a rotational rate of said roller wherein a rotational rate below a first predetermined threshold higher than zero will induce line scrolling of the window and a rotational rate higher than said first predetermined threshold will induce page scrolling of the window, and axis defining scroll bars on said window wherein a scrolling axis may be dynamically selected by moving the mouse to make contact with a scroll bar associated with a desired axis, wherein the roller and hidden mouse control button have default scrolling functions which may be changed by a user to define an alternate desired function other than scrolling and wherein moving the mouse to any scroll bar overrides the user defined alternate desired function and restores the roller's and control button's scrolling functions.

17. The system of claim 16 further defined by a scroll bar not associated with a scrolling axis displayed within said window and wherein placing the cursor over the scroll bar causes the roller to control the scroll bar.

18. The system of claim 16 wherein pressing of the roller actuates the hidden mouse control button which initiates a power scroll feature in which window scrolling is uniform and continuous without the need of further rotations of the roller and in which the speed of window scrolling can be dynamically changed by additional rotations of the roller.

19. The system of claim 18 wherein additional pressing of the roller will toggle the power scroll feature causing window scrolling to momentarily pause.

* * * * *